(12) United States Patent
Combes et al.

(10) Patent No.: US 8,205,826 B2
(45) Date of Patent: Jun. 26, 2012

(54) DEVICE FOR ATTACHING AN AIRCRAFT ENGINE AND AIRCRAFT COMPRISING AT LEAST ONE SUCH DEVICE

(75) Inventors: Stephane Combes, Buzet sur Tarn (FR); Emmanuel Guillet, Plaisance du Touch (FR)

(73) Assignee: Airbus Operations SAS, Toulouse (FR)

( * ) Notice: Subject to any disclaimer, the term of this patent is extended or adjusted under 35 U.S.C. 154(b) by 281 days.

(21) Appl. No.: 12/594,455

(22) PCT Filed: Apr. 11, 2008

(86) PCT No.: PCT/EP2008/054428
§ 371 (c)(1),
(2), (4) Date: Oct. 7, 2009

(87) PCT Pub. No.: WO2008/125631
PCT Pub. Date: Oct. 23, 2008

(65) Prior Publication Data
US 2010/0116926 A1 May 13, 2010

(30) Foreign Application Priority Data
Apr. 13, 2007 (FR) ..................... 07 54464

(51) Int. Cl.
*B64D 27/00* (2006.01)
(52) U.S. Cl. ........................... 244/54; 60/796
(58) Field of Classification Search .................... 244/54; 248/554–557; 60/796, 797; 384/222
See application file for complete search history.

(56) References Cited

U.S. PATENT DOCUMENTS

| | | | |
|---|---|---|---|
| 6,296,203 B1 * | 10/2001 | Manteiga et al. | 244/54 |
| 7,108,224 B2 * | 9/2006 | Pasquer et al. | 244/54 |
| 7,607,609 B2 | 10/2009 | Levert | |
| 7,708,224 B2 * | 5/2010 | Aho-Mantila et al. | 244/54 |
| 7,931,232 B2 * | 4/2011 | Bernardi et al. | 244/54 |

FOREIGN PATENT DOCUMENTS

| | | |
|---|---|---|
| EP | 0 564 126 A1 | 10/1993 |
| FR | 2 770 486 A1 | 5/1999 |
| FR | 2 887 850 A1 | 1/2007 |
| FR | 2 903 383 A1 | 1/2008 |

OTHER PUBLICATIONS

U.S. Appl. No. 12/596,555, filed Oct. 19, 2009, Combes, et al.
U.S. Appl. No. 12/664,256, filed Dec. 11, 2009, Combes, et al.
U.S. Appl. No. 13/078,593, filed Apr. 1, 2011, Combes, et al.
U.S. Appl. No. 12/674,555, filed Feb. 22, 2010, Guillet, et al.

* cited by examiner

*Primary Examiner* — Joshua J Michener
*Assistant Examiner* — Medhat Badawi
(74) *Attorney, Agent, or Firm* — Oblon, Spivak, McClelland, Maier & Neustadt, L.L.P.

(57) ABSTRACT

A device for attaching an aircraft engine including a thrust force take-up device that includes a main fitting to be fixed to an engine mounting beam fixed to a box structure, an additional fitting fixed to the main fitting, and two load reacting link rods connected to the main fitting by a balance beam, each of the link rods being connected to the balance beam by a first longitudinal end by a first mechanical connection that has at least one axis of rotation, each of the link rods being connected to the additional fitting by a second longitudinal end by a second mechanical connection that has at least one axis of rotation, the second mechanical connection having play, the first and second mechanical connections having at least one axis of rotation in common.

12 Claims, 4 Drawing Sheets

DEVICE FOR ATTACHING AN AIRCRAFT ENGINE AND AIRCRAFT COMPRISING AT LEAST ONE SUCH DEVICE

TECHNICAL FIELD AND PRIOR ART

The present invention relates in a general manner to a device for attaching an aircraft engine, for example designed to be interposed between an aircraft wing and the engine involved, as well as to an engine assembly which includes such an attachment device.

The invention may be used on any type of aircraft fitted with, for example, turbojet or turboprop engines.

This type of attachment device, also known as a mounting pylon or "EMS" ("Engine Mounting Structure"), may either be used to suspend an engine beneath the wing of an aircraft or to mount said engine above said wing or even to attach said engine to the rear part of the aircraft's fuselage.

Such an attachment device is in effect envisaged as forming a connecting interface between a turbojet engine and an aircraft's wing. It allows the forces generated by its associated turbojet engine to be transferred to the structure of this aircraft and also provides routing for fuel, electrical, hydraulic and air systems between the engine and the aircraft.

In order to allow forces to be transmitted, the attachment device is comprised of a rigid structure, also known as the primary structure, often a box-type structure; that is, one formed of an assembly of upper and lower spars and of lateral panels connected together by means of transverse ribs.

On the other hand, the device is equipped with means of attachment interposed between the turbojet engine and the rigid structure, where these means include overall two engine attachment members as well as a thrust force take-up device for the thrust forces generated by the turbojet engine.

In the prior art, this thrust force take-up device includes, for example, two lateral link rods which are connected, on the one hand, to the turbojet engine's fan casing and on the other hand are connected to a balance beam, itself mounted so that it pivots on the rigid structure of the attachment device.

Similarly the attachment device also includes another series of attachment members which form a mounting system interposed between the rigid structure and the wing of the aircraft, where this system is usually made up of two or three attachment members.

Finally, the pylon is equipped with a secondary structure which separates and holds the systems whilst supporting aerodynamic fairings.

As has been described above, the solutions proposed previously envisage that the thrust force take-up device incorporates a balance beam mounted so that it pivots on the rigid structure, by means of a connecting pin. As regards this, it should be stated that in order to ensure a so-called "Fail Safe" function for the transmission of forces along the longitudinal direction, the balance beam is usually made using two superimposed fittings, so that the connecting pin itself is in the form of a double pin. Thus in the event of one of the two superimposed fittings which make up the balance beam breaking, the other will provide reaction to the forces coming from the lateral link rods on its own, and, in the event of the external pin of the double connecting pin breaking, the internal pin takes over in order to provide reaction and transmit these said forces along the longitudinal direction.

One example of a load reaction device is known from document FR 06 52890; this device includes two load reacting link rods each connected at a rear end to a balance beam through a first mechanical connection, itself linked mechanically to a rigid support fixed to the pylon. The link rods are also connected by their rear ends to a second mechanical connection with play between the rear end of each link rod and the rigid structure. Thus, in normal operation, the transmission of forces from the link rods to the pylon occurs through the first mechanical connection. In the event of a failure, for example in the event of the balance beam being broken, forces are transmitted through the second mechanical connections. This thrust force take-up device is highly effective and very safe, but it is of complex design and has a high mass.

Another thrust force take-up device is known from document FR 2 887 850, for which the fail-safe function is achieved in particular by means of end-stops provided forward of the thrust force take-up device, where the end-stops are fixed directly on the box structure. In some applications the box structure is of relatively small width, preventing these end-stops from being fitted. Two superimposed balance beams are also envisaged, a first balance beam for thrust load reacting in normal operation, and a second balance beam for thrust load reacting in the event of the first balance beam breaking.

Consequently it is an objective of the present invention to provide a device for attaching an aircraft engine which includes a thrust force take-up device which provides a so-called "fail-safe" function, which is simple and compact in design, and which has a low mass.

PRESENTATION OF THE INVENTION

The above stated objective is achieved by an engine-attachment device for an aircraft which includes a thrust force take-up device which includes a main fitting designed to be fixed onto the box structure, a additional fitting fixed to the main fitting, two load reacting link rods linked mechanically to the first fitting by a balance beam, where the link rods are fixed by a first longitudinal end onto the balance beam using a pin, where the said pin passes, leaving some play, through the additional fitting. In the event of a link rod breaking, the balance beam then comes to a stop against the additional fitting by means of the said pin, thus restricting its rotation. In the event of the balance beam or the pin between the balance beam and the main fitting breaking, there is load reaction directly between the link rod or rods involved and the additional fitting.

In other terms, the additional fitting is superimposed onto the main fitting, and the mechanical connections between the link rods and the main fitting and between the link rods and the additional fitting include a common axis of rotation, which means that a compact device of low mass is obtained.

The main subject-matter of the present invention is therefore an engine attachment device for an aircraft which includes a thrust force take-up device which includes a main fitting designed to be fixed onto an engine mounting beam fixed onto a box structure, a additional fitting fixed onto the main fitting, where the additional fitting is distinct from the main fitting, two load reacting link rods connected to the main fitting by a balance beam, where each of the link rods is connected at a first longitudinal end to the balance beam through a first mechanical connection that has at least one axis of rotation, where said link rods are connected at their first longitudinal end to the additional fitting by a second mechanical connection that has at least one axis of rotation, where the said second mechanical connection exhibits play, with said first and second mechanical connections having at least one axis of rotation in common.

In one specific example, the first and second links each include a single axis of rotation, made using a pin passing through the link rod, the balance beam and the additional fitting, where the play in the second mechanical connection is achieved by means of a bore, whose diameter is greater than the pin, made in the additional fitting.

For example, the additional fitting includes a base and arms which approximately form a V, where the said base is fixed to the main fitting and where the arms extend on each lateral side of the main fitting in the direction of the balance beams, where the pins of the link rods pass through the bores made in the ends of the arms of the additional fitting.

The main fitting may include two branches which form a gap which receives the base of the additional fitting.

The balance beam may, for example, include lateral forks which hold the ends of the arms of the additional fitting, with the link rods each including a fork each of which surrounds a lateral fork of the balance beam. The balance beam may then be mechanically linked to the main fitting by a pin passing through the fitting and a central body of the balance beam from which the lateral flanges protrude.

In an advantageous example, the pins connecting the link rods to the balance beam and to the additional fitting and the pin linking the balance beam to the main fitting are parallel.

The attachment device according to the present invention may include a forward engine attachment member and a rear engine attachment member, where the thrust force take-up device is connected to the rear engine attachment member.

The present invention also has as a subject an engine assembly which includes an engine and a device for attaching the engine, where the said attachment device is a device according to the present invention.

Another subject-matter of the present invention is an aircraft comprising at least one engine assembly according to the present invention, assembled onto a wing or onto a rear part of the fuselage of said aircraft.

BRIEF DESCRIPTION OF THE DRAWINGS

The present invention will be more clearly understood using the following description and the appended drawings, in which.

DETAILED DESCRIPTION OF SPECIFIC EMBODIMENTS

Figure 1:
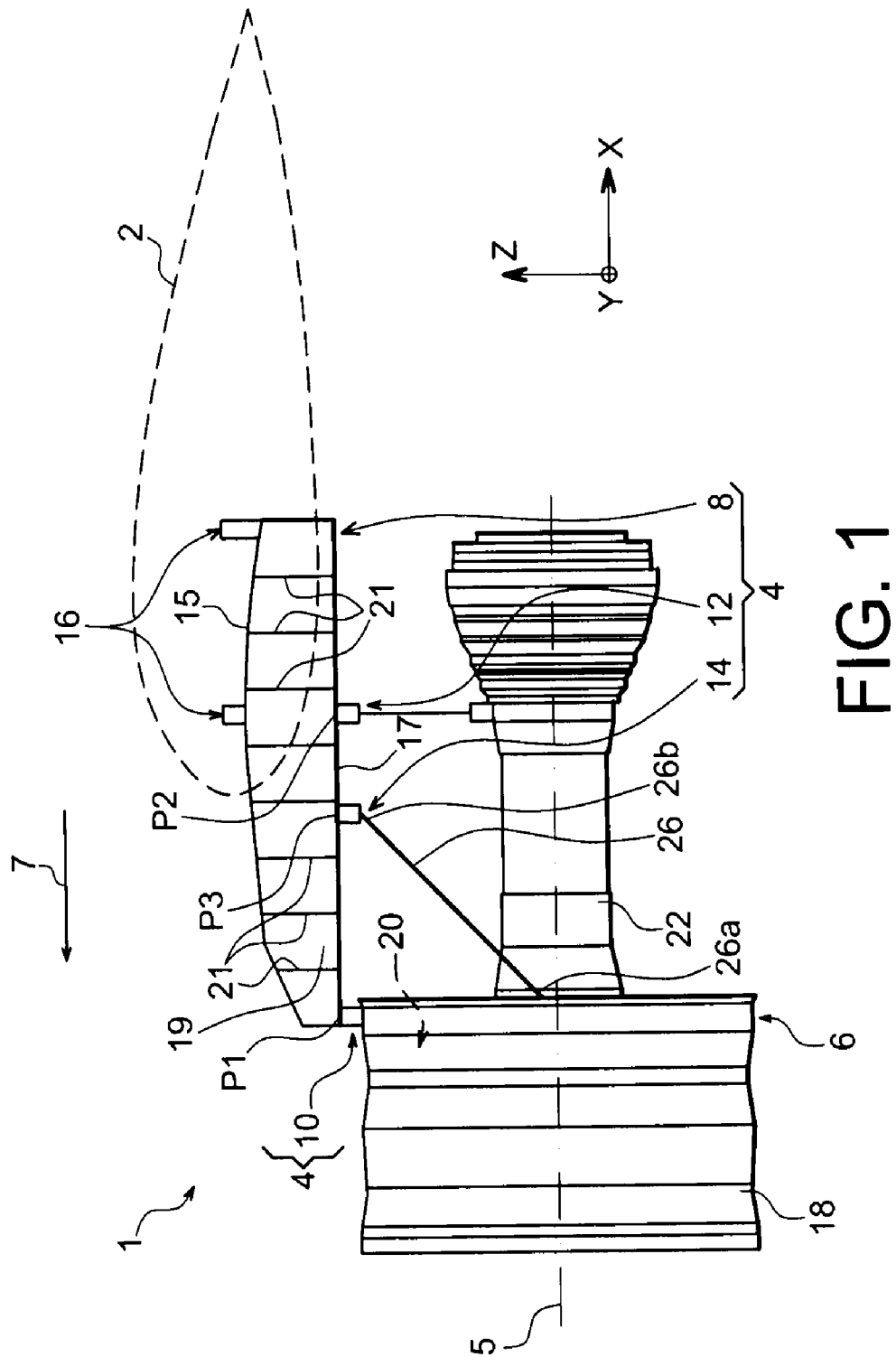
FIG. 1 represents a general schematic side view of an engine assembly for an aircraft, which includes a pylon mounting structure.

With reference to FIG. 1, an aircraft engine assembly 1 is shown which is intended to be fixed beneath a wing 2 of same aircraft, represented only schematically in dotted lines for the sake of clarity, where this assembly 1 includes an attachment device 4 together with an engine 6 such as a turbojet engine attached beneath this device 4.

Overall the attachment device 4 includes a rigid structure 8 which carries means for attachment of the engine 6, where these means of attachment are equipped with multiple engine attachment members 10, 12, as well as a thrust force take-up device 14 for thrust generated by the engine.

For information, it should be noted that the assembly 1 is designed to be surrounded by a nacelle (not shown) and that the attachment device 4 includes another series of attachment members 16 which are used to suspend this assembly 1 beneath the aircraft's wings.

Throughout the description which follows, by convention X is the reference for the longitudinal direction of the device 4 which is also the same as the longitudinal direction of the turbojet engine 6, where this direction X is parallel to a longitudinal axis 5 of this turbojet engine 6 and of that of the device 14. On the other hand, Y is the reference for to the direction transversely orientated in relation to the device 4 and which is the same as the transverse direction of the turbojet 6 and that of the device 14, and Z is the vertical direction or height, where these three directions X, Y, Z are orthogonal to each other.

In addition, the terms "front" and "rear" are to be considered in relation to the direction of forward motion of the aircraft experienced as a result of the thrust exerted by the turbojet engine 6, with this direction being schematically represented by the arrow 7.

In FIG. 1 the two engine attachment members 10, 12, the series of attachment members 16, the thrust force take-up device 14 and the rigid structure 8 of the attachment device 4 can be seen. The other constituent elements of this device 4 that are not shown, such as the secondary structure which separates and holds the systems whilst supporting the aerodynamic fairings, are conventional components which are the same as or similar to those encountered in the prior art, and known to the one having ordinary skilled in the art. There will consequently be no detailed description of these.

On the other hand it is stated that the turbojet 6 is equipped at its front with a fan casing 18 of large dimensions, which surrounds an annular fan case duct 20, and includes towards the rear a central casing 22 of smaller dimensions, which encloses the centre of said turbojet engine. The casings 18 and 20 are, of course, firmly attached to each other.

As may be seen in FIG. 1, there are two engine attachment members 10, 12 provided for the device 4, which are respectively referred to as the front engine attachment member and rear engine attachment member.

In this embodiment example, the rigid structure 8 takes the form of a box structure which extends forwards from the rear, approximately along the direction X.

The box section 8 therefore takes the form of a pylon with a design similar to that usually observed for turbojet engine pylon mounting structures, in particular in that it is made by the assembly of an upper spar 15, a lower spar 17 and two lateral spars/panels 19 (only one can be seen because of the side view), where these elements 15, 17 19 are connected together by transverse ribs 21 which each take the overall form of a rectangle. Thus the ribs 21 extend in the YZ planes, the spars 15, 17 extend roughly in the XY planes and the lateral panels 19 in the XZ planes.

The means of attachment include first of all the front engine attachment member 10, interposed between a front end of the rigid structure 8 also known as the pyramid, and an upper part of the fan housing 18. It would nevertheless be possible to envisage the front engine attachment member 10 being fixed onto a connecting housing between the central housing and the fan housing, as is known to the one having ordinary skilled in the art. The front engine attachment member 10, of a conventional design known to those working in this field, is fixed to a first point P1 of the rigid structure 8, with the latter also being referred to as the primary structure.

On the other hand, the rear motor attachment member 12, also made in a conventional manner familiar to those working in the field, is in turn interposed between the rigid structure 8 and the central housing 22, and fixed at a second point P2 of the rigid structure 8 located towards the rear in relation to the point P1. In the example shown, the thrust force take-up device 14 is fixed to the box structure at a third point P3, located between the first point P1 and the second point P2.

However, as will be seen in the remainder of the description, an attachment device can be advantageously envisaged in which the thrust force take-up device 14 is connected onto the rear attachment member 12.

Figure 2:
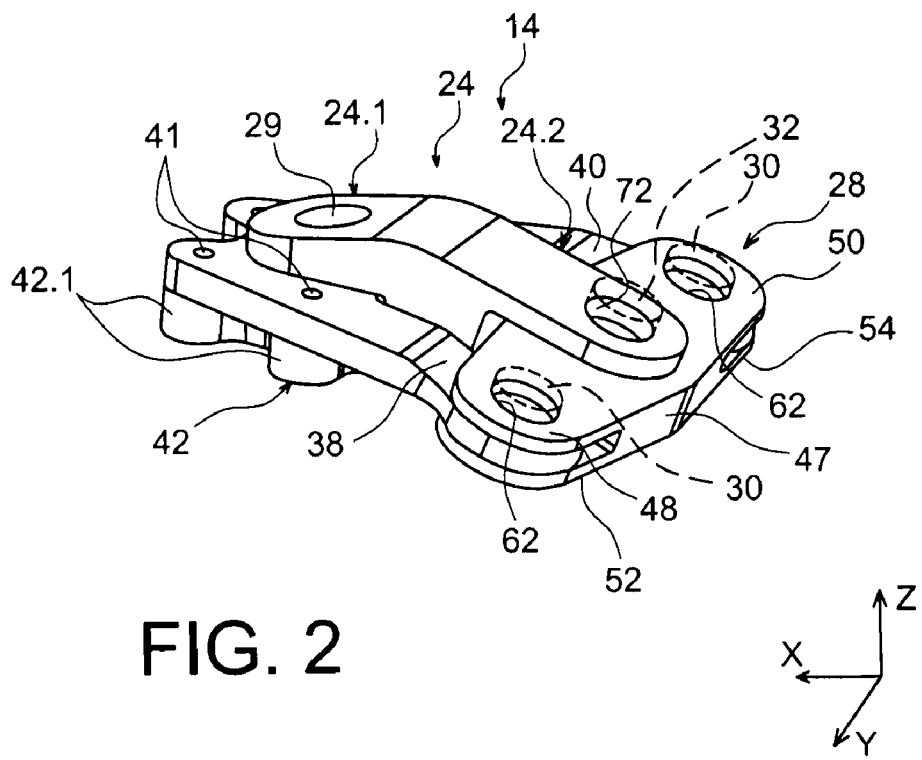
FIG. 2 is a perspective view from above of a thrust force take-up device according to the present invention, where the force transmission link rods have been omitted.
Figure 3:
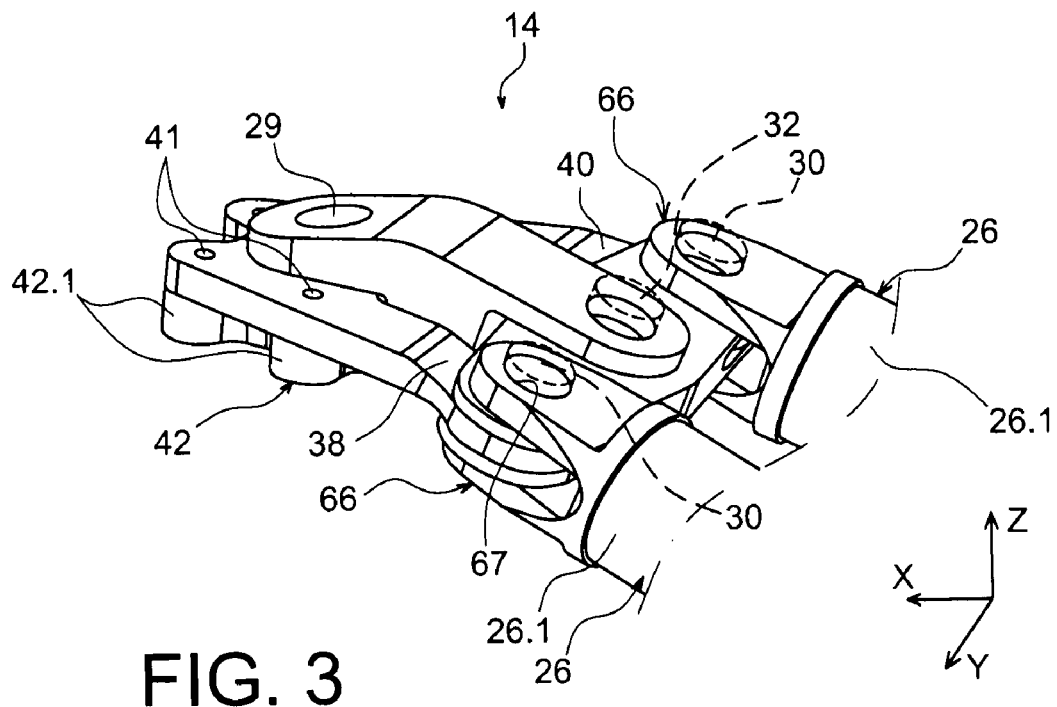
FIG. 3 is a view which is the same as that of FIG. 1, with the ends of the link rods having been added.
Figure 4:
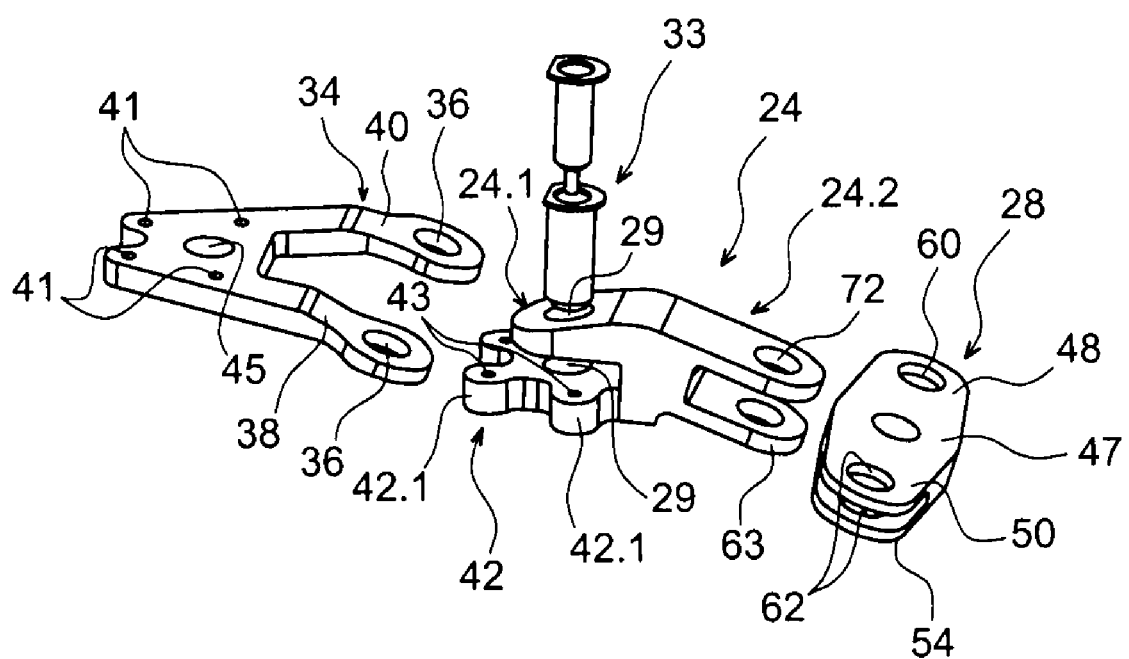
FIG. 4 is an exploded view of FIG. 3, with the pins having been removed and a thrust pin having been added, FIGS. 5A and 5B each represent a three-quarters perspective view of one side of the thrust force take-up device fixed on a spar.

FIGS. 2, 3 and 4 show an embodiment example of a thrust force take-up device, according to the present invention, The device according to the present invention includes a main fitting 24, two link rods 26 (not shown in FIGS. 2 and 4) which are mechanically linked to a balance beam 28 at one longitudinal rear end by means of a pin 30.

Figure 5A:
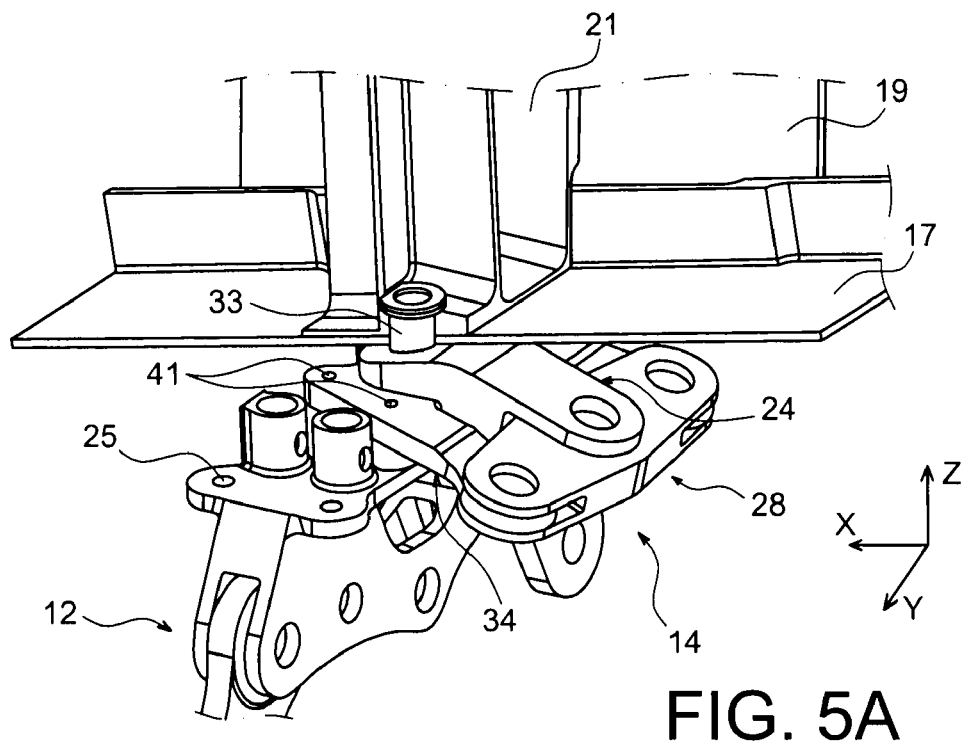
Figure 5B:
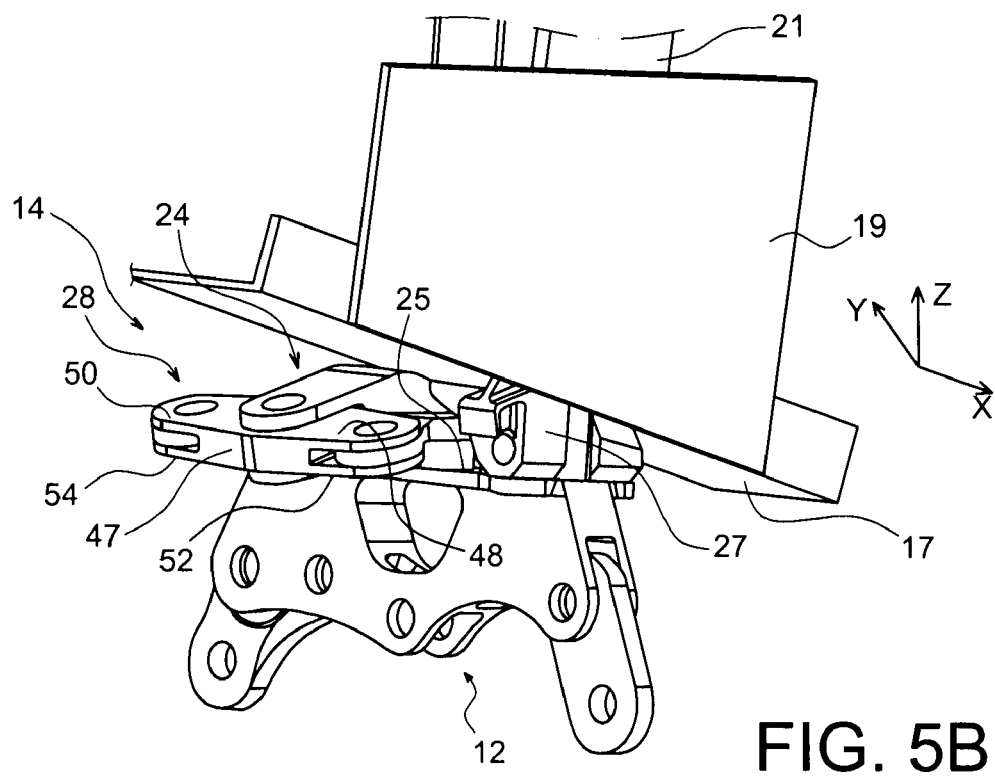

As can be seen in FIGS. 5A and 5B, the main fitting 24 is designed to be firmly fixed to the box structure 8 by a fixing point on a beam 25 of the rear engine attachment member 12, hereafter referred to as the rear engine mounting beam, by means of fastenings which will be described below. The rear engine mounting beam 25 is fixed to the box structure 8 by means of blades 27 joined by fishplates onto the lateral panels 19, which can be seen in FIG. 5B. In this example, there are only two points of interface between the engine and the pylon.

The balance beam 28 is itself mechanically linked to the main fitting 24 by a pin 32, referred to as the main pin.

The pin is located approximately in a median plane of the box section and the link rods 26 are arranged approximately symmetrically in relation to this median plane.

The main fitting 24 is designed to provide reaction to the thrust transmitted by the link rods 26, through the balance beam 28.

The main fitting 24 includes a first plate 24.1 equipped with a bore 29 designed to hold a thrust pin 33 which transmits the thrust force to the pylon. The thrust pin 33 is firmly fixed to one of the transverse ribs 21 of the box structure 8 (FIG. 5A) and a second plate 24.2 on which the balance beam 28 is mounted.

Advantageously, the thrust pin 33 is duplicated i.e. it comprises an internal and external pin as shown in FIG. 4; thus in the event of the external pin breaking, the internal pin takes over the transmission of thrust to the pylon.

The second plate 24.2 is contained in a plane which is inclined in relation to that which contains the first plate 24.1. This configuration allows the link rods to be aligned between the main fitting 24 and the fan casing, where this casing is placed at a lower level in relation to the main fitting 24.

A main fitting 24 which is approximately flat can also be envisaged, where the inclination is then obtained by means of a bevelled distance piece arranged between the main fitting 24 and the box structure 8, or a bevel between the second plate 24.2 and the balance beam 28 may be envisaged.

According to the present invention, the thrust force take-up device includes an additional fitting 34 designed to provide reaction to forces in the event of the link rods, the balance beam or the main pin 32 breaking. The additional fitting 34 forms an additional component which is distinct from the main fitting 24.

The additional fitting 34 includes bores 36 which can be seen in FIG. 4, through which the pins 30 of the link rods 26 pass, where the assembly of the pins 30 in the bores 36 includes play in order to avoid stress being applied to the additional fitting 34 in normal operation.

In the example shown, the additional fitting 34 takes the approximate form of a V, each arm 38, 40 of which includes a bore 36 at its free end for mounting a pin 30.

The additional fitting 34 includes bores 41 at the base of the V formed by the ends of the arms 38, 40 which are connected together, for example four bores, facing the bores 43 made in the main fitting 24. These bores 41, 43 receive traction fittings (not shown) for fixing the main fittings 24 and additional fittings 34 onto the rear engine mounting beam 25.

The additional fitting 34 also includes a bore 45 made approximately in the central part of the base, for the thrust pin 33 to pass through.

In the example shown, the base of the additional fitting 34 is held between the first plate 24.1 and a parallel plate 42 below the plate 24.1 and which is connected to a lower face of the latter. The plate 42 includes a bore 29' facing the bore 29 in order to receive one end of the thrust pin 33.

This configuration means that the volume between the lower spar 17 of the pylon and the rear engine mounting beam 25 is small.

The base of the additional fitting 34 is then fixed to this lower plate 42.

In an advantageous manner, the lower plate 42 of the first plate 24.1 includes an approximately rectangular central body of reduced width which is equipped, at its four corners, with protruding flanges 42.1, each of which possesses bores 43 facing the bores 41 made in the base of the additional fitting 34. This form means that the mass of the main fitting 24, and therefore of the entire device, can be reduced.

Such a form may also be envisaged for the base of the additional fitting 34.

The arms 38, 40 of the additional fitting extend on either side of the second plate 24.2 relative to the median plane of the box structure 8.

The additional fitting 34 has, when viewed from the side, approximately the same profile as that of the main fitting 24, i.e. the base of the V is contained in a plane which is parallel to that of the first plate 24.1 and the arms are contained in a plane which is parallel to that of the second plate 24.2.

The balance beam 28 includes a central body 47 equipped with two upper lateral lugs 48, 50 and two lower lateral lugs 52, 54 which form lateral forks and which each hold a free end of the arms 38, 40.

The upper 48 and lower 52 lugs include bores 60 which are facing for a pin 30 to pass through. Similarly, the upper lugs 50 and lower 54 lugs include bores 62 which are facing for a pin 30 to pass through.

In the example shown, each link rod 26 includes, at its rear end 26.1, a fork 66 designed to surround the lateral forks of the balance beam 28, where each fork 66 includes bores 67 for fitting the pin 30.

The central body 47 of the balance beam is held in a fork 63 of the main fitting 24.

Bores 72 are provided in the second plate 24.2 of the main fitting 24, for the pin 32 to pass through.

The interlocking assembly of the main fitting 24, the additional fitting 34, the balance beam 28 and the link rods 26 means that a very compact thrust force take-up device can be made.

The thrust force take-up device 14 is therefore capable of providing reaction to forces which are mainly exerted along the X axis.

In this manner reaction to the forces which are exerted along the longitudinal direction X is exclusively provided by the thrust force take-up device 14, with reaction to the forces which are exerted along the transverse direction Y being provided jointly by the front 10 and rear 12 attachment members, and the forces which are exerted along the vertical direction Z being taken up jointly by the front attachment member 10 and the two half-attachments of the rear attachment members 12.

On the other hand, reaction to the moment which is exerted along the direction X is provided solely by the two half-attachments of the rear attachment 12, whereas reaction to the moments which are exerted along the Y and Z directions is provided jointly by said two engine attachment points 10, 12.

We will now describe the thrust force transmission paths from the link rods 26 to the box structure 8 in different situations.

In normal configuration, i.e. in the configuration shown in FIG. 3, the thrust forces from the turbojet engine are transmitted through the two link rods 26, to the balance beam 28 through the two pins 30. The balance beam 28 then has an approximately balanced position, since the forces transmitted by link rods are approximately the same. These forces are then transmitted to the main fitting 24 through the pin 32. Reaction to these forces is then provided by the box section 8 by means of the thrust pin 33 which is firmly fixed to the pylon and which is housed in the bores 29, 29' of the main fitting 24 and in bore 45 of the additional fitting 34, with the main 24 and additional fittings 34 being fixed to the rear engine mounting beam 25.

The additional fitting 34 plays no part because of the play between the pins 30 and the bores 36 in the free ends of the branches 38, 40.

In the event of a link rod 26 breaking, the thrust forces are only transmitted by the intact link rod 26 on the balance beam 29, so the balance beam 28 then swivels around the pin 32. The pin 30, however, which connects the intact link rod 26 to the balance beam 28 then comes up against the outline of the associated bore 36 of the additional fitting 34. The degree of swivel of the balance beam 28 around pin 32 is therefore limited. The forces are thus transmitted to the main fitting 24 via the pin 30 and the additional fitting 34 fixed to the main fitting 24 by the traction fittings housed in the bores 41. Reaction to the forces is then provided by the box structure 8 by means of the thrust pin 33.

The device according to the present invention avoids risk of damage to the lateral blades in the event of the link rods braking, which improves the reparability of the device.

In the event of the balance beam 28 breaking, forces are then transmitted by each pin 30 coming into contact with the outside of the bore 36 in the additional fitting 34 holding it, and forces are then transmitted to the main fitting 24 by the four fastenings which fix the additional fitting 34 onto the main fitting 24.

The thrust force take-up device according to the invention offers a simple and compact design, and has a low mass. In addition the manufacturing cost is low.

In addition this device requires no special tooling for fitting or removal of the turbojet engine.

Furthermore, the thrust force take-up device according to the invention means that it can be connected to the rear attachment point as has been described above in relation to FIGS. 5A and 5B. Thus, advantageously, only two points of interface between the engine and the pylon are envisaged, which avoids the need for special tooling for assembly.

The thrust force take-up device represented in FIGS. 2 to 4, 5A and 5B has been described by way of an example only and is not restrictive. Modifications may be made without departing from the context of the invention. For example, the mechanical connections between the link rods, the balance beam and the additional fitting may be achieved in a different manner. In particular the rear end of the link rods could be envisaged as having no forks and could be mounted inside the lateral forks of the balance beam, with the two arms of the additional fitting including, in turn, at their free end, forks which surround the lateral forks of the balance beam.

The mechanical connections between each link rod and the additional fitting and between each link rod and the balance beam could also be of the ball-joint type.

The invention claimed is:

1. A device for attachment of an engine for an aircraft comprising:
    a thrust force take-up device which includes:
        a main fitting to be fixed onto an engine mounting beam fixed onto a box structure;
        an additional fitting fixed by a mechanical connection onto the main fitting, wherein the additional fitting is distinct from the main fitting;
        two load reacting link rods linked to the main fitting by a balance beam, wherein each of the link rods is connected at a first longitudinal end to the balance beam by a first mechanical connection that has at least one axis of rotation, wherein each of the link rods is linked at its first longitudinal end to the additional fitting by a second mechanical connection that has at least one axis of rotation;
        wherein the second mechanical connection has play and wherein the first and second mechanical connections have at least one axis of rotation in common.

2. A device according to claim 1, wherein the first and second mechanical connections each include a single axis of rotation, made using a pin which passes through the link rod, the balance beam and the additional fitting, wherein play in the second mechanical connection is achieved by a bore, whose diameter is greater than the pin, made in the additional fitting.

3. A device according to claim 2, wherein the additional fitting includes a base and arms which approximately form a V, wherein the base is fixed to the main fitting and wherein the arms extend on each lateral side of the main fitting in the direction of the balance beam, with the pins of the link rods passing through bores made in the ends of the arms of the additional fitting.

4. A device according to claim 3, wherein the main fitting includes two branches that form a gap that holds the base of the additional fitting.

5. A device according to claim 3, wherein the balance beam includes lateral forks that hold the ends of the arms of the additional fitting, with the link rods each including a fork each of which surrounds a lateral fork of the balance beam.

6. A device according to claim 5, wherein the balance beam is mechanically linked to the main fitting by a pin passing through the main fitting and a central body of the balance beam from which the lateral forks protrude.

7. A device according to claim 6, wherein the pins that connect the link rods to the balance beam and to the additional fitting and the pin linking the balance beam to the main fitting are parallel.

8. A device according to claim 1, further comprising a forward engine attachment member and a rear engine attachment member, wherein the thrust force take-up device is connected to the rear engine attachment member.

9. An engine assembly comprising:

an engine; and a device for attaching to the engine, wherein the attachment device comprises a thrust force take-up device which includes:

a main fitting to be fixed onto an engine mounting beam fixed onto a box structure;

an additional fitting fixed by a mechanical connection onto the main fitting, wherein the additional fitting is distinct from the main fitting;

two load reacting link rods linked to the main fitting by a balance beam, wherein each of the link rods is connected at a first longitudinal end to the balance beam by a first mechanical connection that has at least one axis of rotation, wherein each of the link rods is linked at its first longitudinal end to the additional fitting by a second mechanical connection that has at least one axis of rotation;

wherein the second mechanical connection has play and wherein the first and second mechanical connections have at least one axis of rotation in common.

10. An aircraft comprising at least one engine assembly according to claim 9, assembled onto a wing or onto a rear part of the fuselage of the aircraft.

11. A device according to claim 1, wherein the additional fitting is connected to a rearward portion of the main fitting.

12. An engine assembly according to claim 9, wherein the additional fitting is connected to a rearward portion of the main fitting.

* * * * *